Patented Feb. 17, 1931

1,793,390

UNITED STATES PATENT OFFICE

FRIEDRICH FELIX AND WOLFGANG JAECK, OF BASEL, SWITZERLAND, ASSIGNORS TO SOCIETY OF CHEMICAL INDUSTRY IN BASLE, OF BASEL, SWITZERLAND

PROCESS FOR THE PRODUCTION OF AZO-DYESTUFFS ON ACIDYL CELLULOSE

No Drawing. Application filed November 28, 1927, Serial No. 236,360, and in Switzerland December 4, 1926.

The present invention relates to a process for the production of dyestuffs valuable for the production of fast tints on acidyl cellulose. It comprises the process of producing these dyestuffs, and the material dyed according to the new process.

It has been found that new dyestuffs are obtained which are valuable as pigments by treating the diamino-azo-dyestuffs of the general formula:

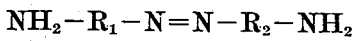

wherein $R_1$ and $R_2$ signify two aryl residues which may be different from each other, with nitrous acid, and coupling the compound thus obtained in a medium in which pH is smaller than 7.1 with a compound of the general formula:

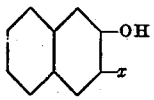

in which $x$ means H or COOH.

The products thus obtained correspond to the general formula:

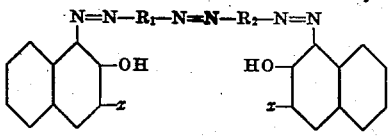

wherein $R_1$, $R_2$ and $x$ have the above mentioned significations. They form dark to black powders which are insoluble in water, but soluble in concentrated sulfuric acid with blue to green color. These products are valuable for the dyeing of lacquers and particularly for the production of fast tints on acidyl cellulose. For this purpose the dyestuffs of the above explained general formula $NH_2-R_1-N=N-R_2-NH_2$ are dyed on acidyl cellulose, then tetrazotized on the material, and finally coupled with β-naphthol or 2:3-hydroxynaphthoic acid under the conditions above referred to.

The following example illustrates the invention, the parts being by weight:—

Example 12 parts of a paste made by stirring with 200 parts of a suitable distributing agent, 50 parts of the diamino-azo-dyestuff obtained by saponifying the coupling product from diazotized paraaminoacetanilide and cresidine, are emulsified at 60° C with 80 parts of soap solution of 10 per cent. strength and the suspension is diluted with lukewarm water to about 4000 parts.

Into the dye-bath thus prepared the thoroughly wetted acetate silk (100 parts) is entered and dyeing is continued for about an hour, the temperature being gradually raised to 75° C. The yellow dyed acetate silk is then washed, in the course of 30 minutes treated with 3–4 parts of sodium nitrite and 9–12 parts of hydrochloric acid, amounting to 1/20th of the liquor, and the dyeing is then developed in a bath at 60° C. of β-hydroxynaphthoic acid acidified with an acid the pH of which in a 1/10 normal solution in water lies in the neighbourhood of 3 and containing 3–4 parts of β-hydroxynaphthoic acid.

The silk is then washed, if necessary soaped, and brightened as usual. Deep black shades are obtained of excellent fastness. The formula of the new dyestuff is very probably the following:

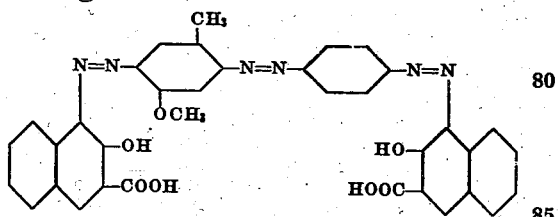

With β-naphthol in a feebly acid coupling bath there are also obtained deep black shades which, however, have not the outstanding fastness to light of the dyeing developed with β-hydroxynaphthoic acid. The probable formula of the β-naphthol dyestuff is:

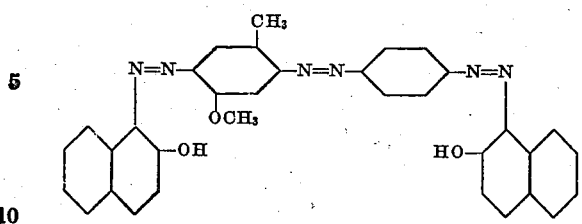

If the development with β-naphthol is conducted as usual in alkaline solution only brown, valueless shades are obtained.

Marine blue tints are obtained if instead of 12 parts of the dyestuff paste only 6 or fewer are used.

Black shades are obtained with other diamino-azo-compounds, such as para-para'-diamino-azo-benzene, the reduced coupling product from para- or meta-nitro-diazo-benzene and α-naphthylamine and the like.

As suitable distributing agents referred to in the first paragraph of this example may be named aqueous solutions of sulphonic acid salts, such as delimed sulphite cellulose lye, condensation products of formaldehyde and naphthalene sulphonic acids, sulphonation products of the residues from the manufacture of organic compounds, such as benzaldehyde, humin substances and soap solutions.

What we claim is:—

1. A process for the production of azo-dyestuffs of the probable general formula:

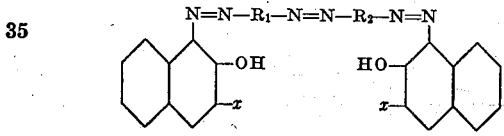

wherein $R_1$ and $R_2$ signify aryl residues which may be different from each other, and $x$ means H or COOH, on acidyl cellulose, consisting in firstly dyeing acidyl cellulose with diamino-azo-dyestuffs of the general formula:

$$NH_2-R_1-N=N-R_2-NH_2,$$

wherein $R_1$ and $R_2$ have the above identified signification, then treating the dyed material with nitrous acid, and finally coupling it in a medium in which pH is smaller than 7.1, with compounds of the general formula:

wherein $x$ has the above identified signfication.

2. A process for the production of azo-dyestuffs of the probable general formula:

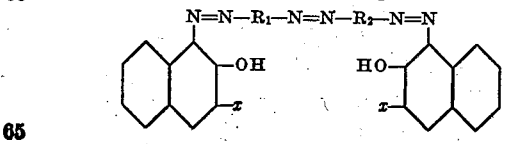

wherein $R_1$ and $R_2$ signify aryl residues which may be different from each other, and $x$ means H or COOH, on acetyl cellulose, consisting in firstly dyeing acetyl cellulose with diamino-azo-dyestuffs of the general formula:

$$NH_2-R_1-N=N-R_2-NH_2,$$

wherein $R_1$ and $R_2$ have the above identified signification, then treating the dyed material with nitrous acid, and finally coupling it in a medium in which pH is smaller than 7.1, with compounds of the general formula:

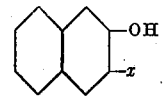

wherein $x$ has the above identified signification.

3. A process for the production of azo-dyestuffs of the probable general formula:

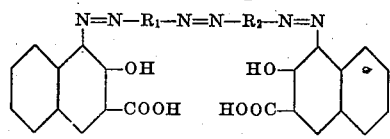

wherein $R_1$ and $R_2$ signify aryl residues which may be different from each other, on acidyl cellulose, consisting in firstly dyeing acidyl cellulose with diamino-azo-dyestuffs of the general formula:

$$NH_2-R_1-N=N-R_2-NH_2,$$

wherein $R_1$ and $R_2$ have the above identified signification, then treating the dyed material with nitrous acid, and finally coupling it in a medium in which pH is smaller than 7.1, with β-hydroxynaphthoic acid.

4. A process for the production of azo-dyestuffs of the probable general formula:

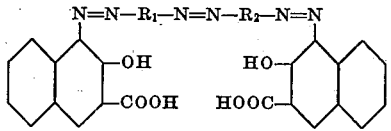

wherein $R_1$ and $R_2$ signify aryl residues which may be different from each other, on acetyl cellulose, consisting in firstly dyeing acetyl cellulose with diamino-azo-dyestuffs of the general formula:

$$NH_2-R_1-N=N-R_2-NH_2,$$

wherein $R_1$ and $R_2$ have the above identified signification, then treating the dyed material with nitrous acid, and finally coupling it in a medium in which pH is smaller than 7.1, with β-hydroxynaphthoic acid.

5. A process for the production of azo-dyestuffs of the probable general formula:

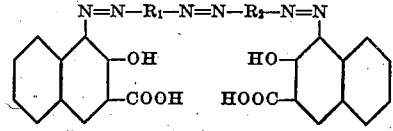

wherein $R_1$ and $R_2$ signify aryl residues of the benzene series which may be different from each other, on acidyl cellulose, consisting in firstly dyeing acidyl cellulose with diamino-azo-dyestuffs of the general formula:

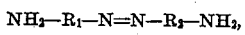

wherein $R_1$ and $R_2$ have the above identified signification, then treating the dyed material with nitrous acid, and finally coupling it in a medium in which pH is smaller than 7.1, with β-hydroxynaphthoic acid.

6. A process for the production of azo-dyestuffs of the probable general formula:

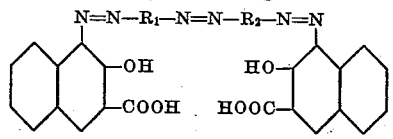

wherein $R_1$ and $R_2$ signify aryl residues the benzene series which may be different from each other, on acetyl cellulose, consisting in firstly dyeing acetyl cellulose with diamino-azo-dyestuffs of the general formula:

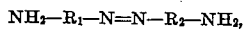

wherein $R_1$ and $R_2$ have the above identified signification, then treating the dyed material with nitrous acid, and finally coupling it in a medium in which pH is smaller than 7.1, with β-hydroxynaphthoic acid.

7. A process for the production of azo-dyestuffs of the probable formula:

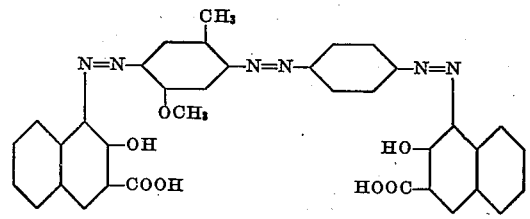

on acidyl cellulose, consisting in firstly dyeing acidyl cellulose with the diamino-azo-dyestuff of the formula:

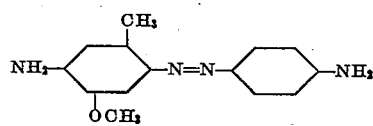

then treating the dyed material with nitrous acid, and finally coupling it in a medium in which pH is smaller than 7.1, with β-hydroxynaphthoic acid.

8. A process for the production of azo-dyestuffs of the probable formula:

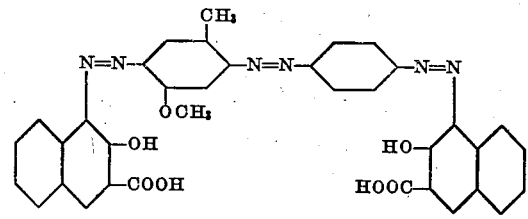

on acetyl cellulose, consisting in firstly dyeing acetyl cellulose with the diamino-azo-dyestuff of the formula:

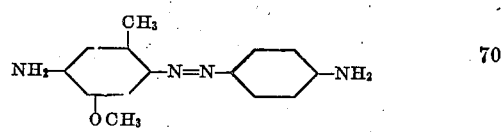

then treating the dyed material with nitrous acid, and finally coupling it in a medium in which pH is smaller than 7.1, with β-hydroxynaphthoic acid.

In witness whereof we have hereunto signed our names this 17th day of November, 1927.

FRIEDRICH FELIX.
WOLFGANG JAECK.